Aug. 27, 1963 R. H. WITT 3,101,807
TRACTOR HOOD LATCH
Filed Aug. 21, 1961 2 Sheets-Sheet 2
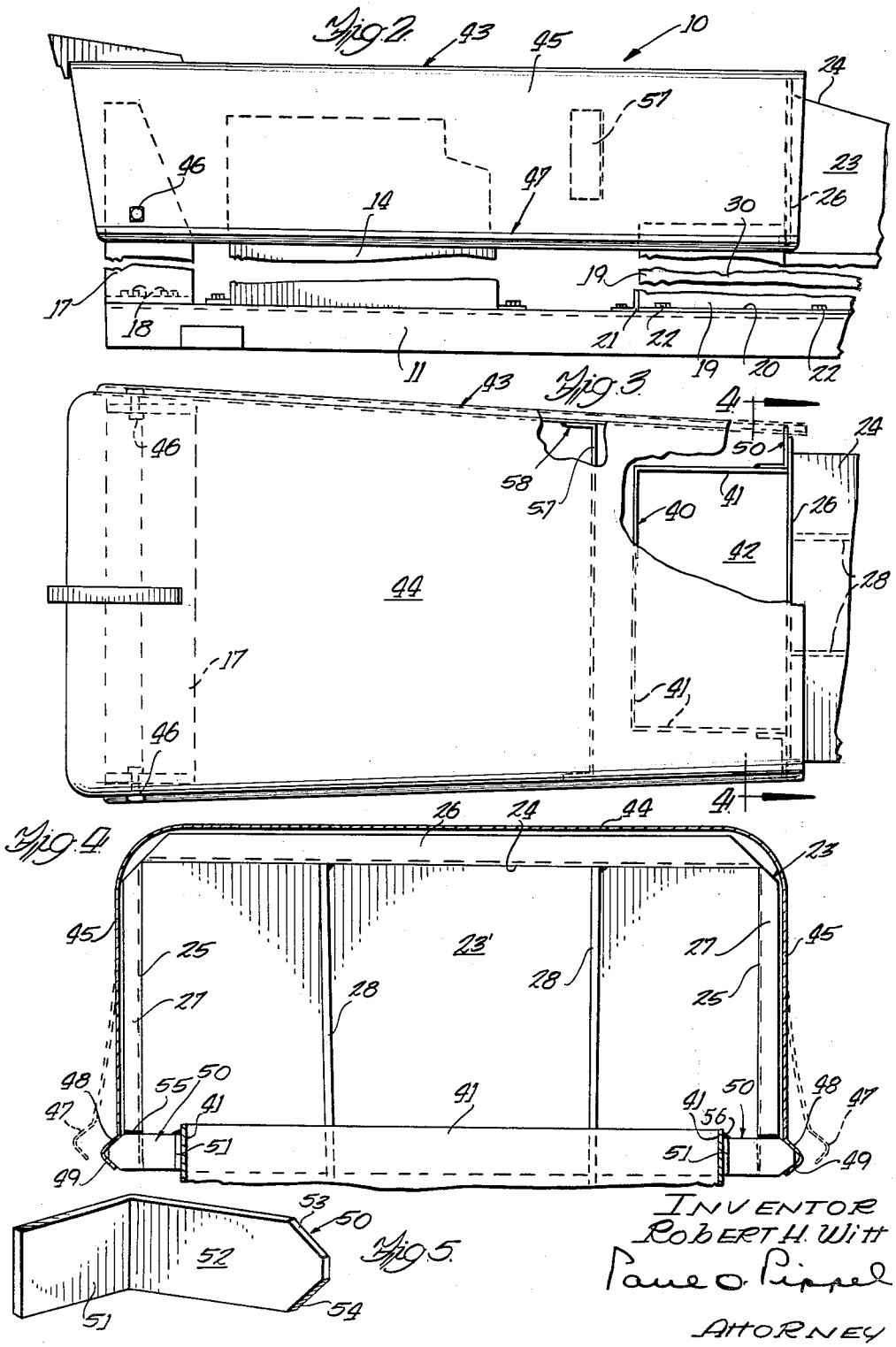
INVENTOR
Robert H. Witt
Paul O. Pippel
ATTORNEY

United States Patent Office 3,101,807
Patented Aug. 27, 1963

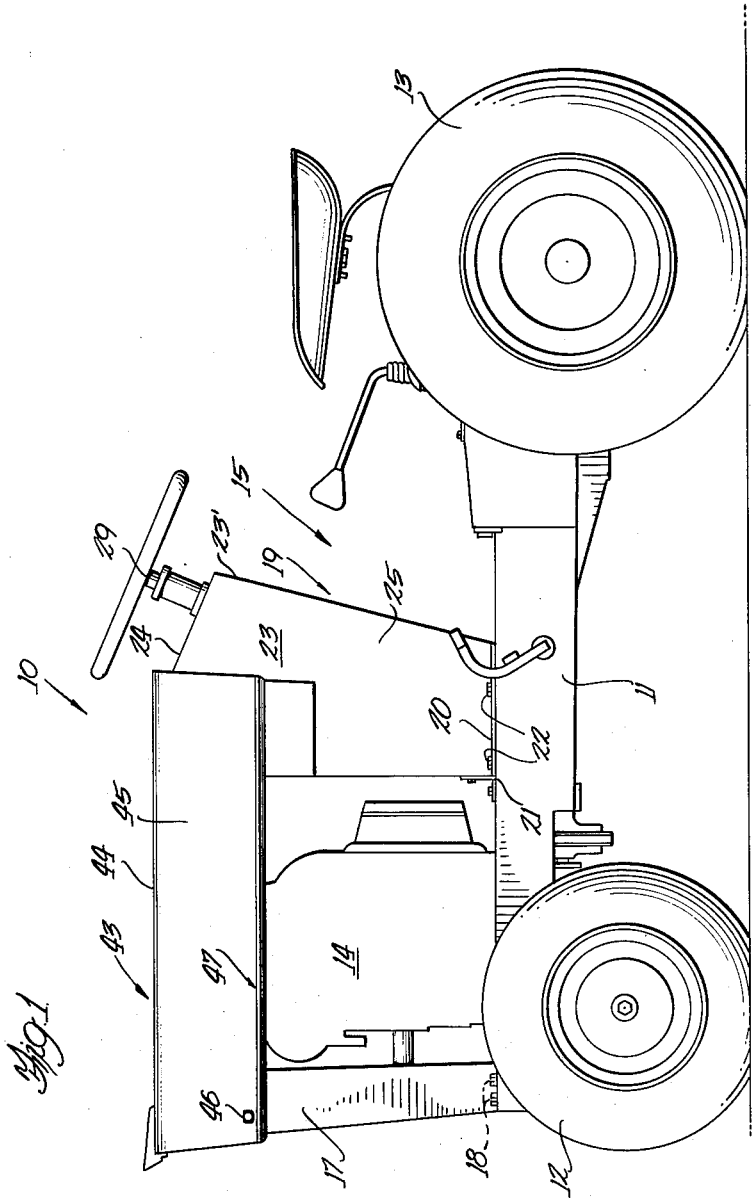

3,101,807
TRACTOR HOOD LATCH
Robert H. Witt, Hinsdale, Ill., assignor to International Harvester Company, Chicago, Ill., a corporation of New Jersey
Filed Aug. 21, 1961, Ser. No. 132,718
3 Claims. (Cl. 180—69)

This invention relates to a hood construction particularly suited for tractors. More specifically, the invention relates to an improved latching device for a tractor hood.

It is a prime object of the invention to provide an improved hood latch mechanism for tractors.

It is another object to provide for an improved simplified latch mechanism for retaining a tractor hood in a closed position.

Another object of the invention is to provide an improved latch mechanism for a tractor hood which is simplified, inexpensive, and effectively retains the hood in a closed position.

A still further object is to provide an improved latching device for a tractor hood, the said latching device providing a positive latch for retaining the hood in a closed position, the hood being constructed whereby it can easily be opened and closed by the operator.

Another object of the invention is to provide an improved hinged-type hood construction for tractors, the said construction including a novel simplified latch mechanism which, utilizing the inherent spring-like resiliency of the hood, provides a positive lock for the hood in the closed position and permits the same to be easily opened by the utilization of manual pressure on the part of the operator.

These and other objects will become more readily apparent from a reading of the description when examined in connection with the accompanying sheet of drawings.

In the drawings:

FIG. 1 is an enlarged side elevational view of a tractor embodying a novel hood construction;

FIG. 2 is a side elevational view of a frame and hood construction of a tractor;

FIG. 3 is a plan view of the hood construction shown in FIG. 2;

FIG. 4 is an enlarged cross-sectional view taken substantially along the line 4—4 of FIG. 3; and FIG. 5 is a detail perspective view of a latch element.

Referring particularly to FIG. 1 of the drawings, a tractor is generally designated by the reference character 10. The tractor 10 comprises a tractor frame 11 having at its forward end front steerable wheels 12 and at its rearmost end rear drive wheels 13. A power unit 14 is suitably supported on the tractor frame 11 and the rear drive wheels are suitably controlled by means of a brake and clutch control pedal generally designated by the reference character 15.

A front support and grille retaining member is designated at 17 and is suitably connected to the frame 11 by means of bolts 18. A rear support in the form of a sheet metal structure 19 is suitably supported on the frame 11 to the rear of the power unit 14. The rear support or sheet metal structure 19 may be of box-type shape suitably welded together and is provided at its lower end with transversely spaced flanges 20, only one of which is shown in FIG. 2, the said flanges 20 being suitably connected to the frame 11 by means of bolt and nut fasteners 22. The rear support 19 is also provided at its upper end with a rearwardly projecting box-like sheet metal housing 23 provided at its rearmost end with a vertical wall 23' and having a top downwardly sloping surface 24 and sides 25. The top 24 is provided with a vertically extending forward flange 26 and the sides 25 are provided with laterally outwardly extending vertical flanges 27. As shown in FIGS. 3 and 4, vertical gusset members 28 are suitably connected to the top and to the wall 23' to reinforce the box-like housing 23. A steering column 29 is adapted to be suitably supported on the structure 19.

The structure 19 is suitably cut-out as indicated at 30 and supports a rectangular metal box 40 having sides 41 and a bottom 42. The box 40 is open at its top and is adapted to support a starting battery (not shown).

As best shown in FIGS. 1, 2 and 3, the tractor hood is generally designated by the reference character 43. The hood 43 comprises a substantially flat top 44 having downwardly extending sides 45 which may be integrally formed with the hood. The hood 43 also may consist of a sheet metal structure and is, as indicated, of inverted U-shape. The sides 45 project downwardly in overlapping relation over the front support 17 and the rear support 19.

The hood 43 is adapted to hinge about the front support 17 and bolt and nut hinge elements 46 connect the sides 45 to the upper ends of the front supports 17. Thus the hood 43 may be swung upwardly and downwardly about the hinge bolts 46 to respectively open and close the tractor hood 43. The sides 45 are provided at their lower ends with longitudinally extending laterally spaced beads 47 which, as best shown in FIG. 4, each include converging portions 48 and 49 disposed in relative V-shape configuration to provide inwardly facing engageable portions or parts. The beads 47 thus serve to stiffen the sides 45 and simultaneously act, at their rearmost ends, as engageable parts for latching the hood, as will be presently described.

As best shown in FIG. 5, a latch element designated at 50 is disclosed. The latch element 50 is provided with an attaching flange 51, which as indicated in FIG. 3, is connected to the outer surfaces of the sides 41 so that the latch elements 50 project outwardly on opposite sides of the metal box 40. The latch elements 50 also include outwardly extending legs 52 which are provided at their outer ends with converging edges 53 and 54 of generally V-shape structure so as to conform to the converging portions 48 and 49 of each of the sides 45. The attaching parts 51 of the latch elements 50 are connected to the sides 41 by means of welds 56 and the legs 52 are similarly attached to the flanges 27 by means of welds 55, as indicated in FIG. 4. A cross brace or bracket 57 of U-shape construction includes attaching flanges 58 which may be suitably welded to the inner surfaces of the sides 45.

As shown in FIGS. 2, 3 and 4, the hood 43 is in a closed position. In this position, as shown in FIG. 4, the latch elements 50 have their outer converging portions 48 and 49 securely conforming to and engaging the edges 53 and 54 so as to securely maintain the hood 43 in the closed position. The latch elements 50 are rigidly supported since they are welded to the box sides 41 and also are welded to the flanges 27. Thus there is no flexing of the legs 52 or the converging edges 53 and 54.

The U-shaped brace 57 holds the sides 54 against appreciable spreading and since the construction is of sheet metal there is an inherent resiliency in the rearmost lower surfaces of the sides 45 which permits the sides to be spread apart but yet the sides will return or are urged to their normal position by means of the said spring-like construction. In the position shown in FIG. 4 the sides 45 are slightly spread apart from their completely normal relaxed position so that the portions 48 and 49 firmly engage and secure the latch elements 50. In other words, in the unlatched position the sides 45 would be urged further inwardly since the position of the brace 57 is so designed that the normal transverse dimension between the engageable parts, in the relaxed position, is less than the transverse dimension between the tips of the latch elements as defined by the edges 50 and 54.

Thus the hood is retained on the latch elements 50 against opening and this is so despite the vibrations which are encountered during the operation of the power unit 14. In order to release the hood the operator simply grasps the lower edges of the converging portions 49 of the beads 47 and manually spreads the edges apart, as shown in the dash lines of FIG. 4, so that the hood 43 can then be swung upwardly to its open position. When opened the hood sides 45 return to their normal position and in order to snap the hood closed a downward pressure is exerted on the top 44, whereupon the converging portions 49 first engage the edges 53 of the latch elements 50 whereupon the hood sides 45 are spread apart and the edges 53 and 54 are snapped into the position, with respect to the portions 48 and 49 as shown in FIG. 4.

Thus it is believed clear that a greatly simplified and thoroughly effective latch mechanism for a hood construction has been disclosed. The structure is particularly well suited to a sheet metal type of hood which may be frequently opened, which may be subjected to high vibrations, and which must be absolutely secured in the closed position. Thus the objects of the invention have been fully achieved and it must be understood that changes and modifications may be made without departing from the spirit of the invention as disclosed or from the scope thereof as defined in the appended claims.

What is claimed is:

1. In a tractor having a longitudinally extending frame, a power unit on said frame, a vertically extending front support supported on said frame forwardly of said power unit, and a vertically extending rear support on said frame rearwardly of said power unit, a hood structure for said tractor comprising an inverted generally U-shaped hood open at its longitudinally spaced ends, said hood having depending vertical laterally spaced side walls and a substantially flat upper wall connected thereto, said side walls being positioned in overlapping relation relative to said supports, means pivotally connecting a forward portion of said hood to said front support for pivotal movement about a horizontal axis whereby said hood may be swung upwardly and downwardly relative to said rear support, a transversely extending brace connected to said side walls, a rear closure plate on said rear support having outer edges conforming generally to the inner surfaces of said top and side walls to close said rear opening during the closed position of said hood, latching means for said hood comprising a generally V-shaped bead provided on each of said side walls along their lower edges thereof, said beads being substantially coextensive with said side walls and each bead providing at a rearward portion of the same a V-shaped engageable part, said engageable parts having openings facing inwardly, a pair of latch elements connected to said rearward support and projecting laterally outwardly therefrom, each latch element having a generally V-shaped end portion engaging each engageable part to retain said hood in a closed position, said side walls having a resiliency whereby the lower portions of said side walls may be forced apart by the application of hand pressure by the operator whereby the engageable parts may be disengaged from the latch elements and the hood may be swung to an open position, and whereupon release of said pressure said side walls return to their normal position and said hood may be returned to a closed position whereupon pressure in a downward direction provides for engagement of lower portions of said side walls with said V-shaped latch elements and said side walls are again resiliently spread apart to permit engagement of said latch elements with said engageable parts.

2. In a tractor having a longitudinally extending frame, a vertically extending front support supported on said frame, and a vertically extending rear support on said frame, a hood structure for said tractor comprising an inverted generally U-shaped hood open at its rear end, said hood having depending vertical laterally spaced side walls and an upper wall connected thereto, said side walls being positioned in overlapping relation relative to said supports, means pivotally connecting a forward portion of said hood to said front support for pivotal movement about a horizontal axis whereby said hood may be swung upwardly and downwardly relative to said rear support, a transversely extending brace connected to said side walls, a rear closure plate on said rear support having outer edges conforming generally to the inner surfaces of said top and side walls to close said rear opening during the closed position of said hood, latching means for said hood comprising a generally V-shaped bead provided on each of said side walls along their lower edges thereof, said beads being substantially coextensive with said side walls and each bead providing at a rearward portion of the same a V-shaped engageable part, said engageable parts having openings facing inwardly, a pair of latch elements connected to said rearward support and projecting laterally outwardly therefrom, each latch element having a generally V-shaped end portion engaging each engageable part to retain said hood in a closed position, said side walls having a resiliency whereby the lower portions of said side walls may be forced apart by the application of hand pressure by the operator whereby the engageable parts may be disengaged from the latch elements and the hood may be swung to an open position, and whereupon release of said pressure said side walls return to their normal position and said hood may be returned to a closed position whereupon pressure in a downward direction provides for engagement of lower portions of said side walls with said V-shaped latch elements and said side walls are again resiliently spread apart to permit engagement of said latch elements with said engageable parts.

3. In a tractor having a longitudinally extending frame, a vertically extending front support supported on said frame, and a vertically extending rear support on said frame, a hood structure for said tractor comprising an inverted generally U-shaped hood, said hood having depending vertical laterally spaced side walls and an upper wall connected thereto, said hood being open at its rearward end, said side walls being positioned in overlapping relation relative to said supports, means pivotally connecting a forward portion of said hood to said front support for pivotal movement about a horizontal axis whereby said hood may be swung upwardly and downwardly relative to said rear support, latching means for said hood comprising a generally V-shaped bead provided on each of said side walls along their lower edges thereof, said beads being substantially coextensive with said side walls and each bead providing at a rearward portion of the same a V-shaped engageable part, said engageable parts having openings facing inwardly, a pair of latch elements connected to said rearward support and projecting laterally outwardly therefrom, each latch element having a generally V-shaped end portion engaging each engageable part to retain said hood in a closed position, said side walls having a resiliency whereby the lower portions of said side walls may be forced apart by the application of hand pressure by the operator whereby the engageable parts may be disengaged from the latch elements and the hood may be swung to an open position, and whereupon release of said pressure said side walls return to their normal position and said hood may be returned to a closed position whereupon pressure in a downward direction provides for engagement of lower portions of said side walls with said V-shaped latch elements and said side walls are again resiliently spread apart to permit engagement of said latch elements with said engageable parts.

References Cited in the file of this patent

UNITED STATES PATENTS

| | | |
|---|---|---|
| 519,839 | Dexter | May 15, 1894 |
| 2,235,496 | Greig | Mar. 18, 1941 |
| 2,237,677 | Lewis | Apr. 8, 1941 |
| 2,871,967 | Du Shane | Feb. 3, 1959 |